United States Patent
Uda

(10) Patent No.: US 8,141,537 B2
(45) Date of Patent: Mar. 27, 2012

(54) CONTROLLING DEVICE AND METHOD OF ESTIMATING VALVE OPENING FOR INTERNAL COMBUSTION ENGINE

(75) Inventor: Toshiaki Uda, Nishikamo-gun (JP)

(73) Assignee: Denso Corporation, Kariya (JP)

( * ) Notice: Subject to any disclaimer, the term of this patent is extended or adjusted under 35 U.S.C. 154(b) by 188 days.

(21) Appl. No.: 12/774,112

(22) Filed: May 5, 2010

(65) Prior Publication Data

US 2010/0282207 A1 Nov. 11, 2010

(30) Foreign Application Priority Data

May 7, 2009 (JP) ................................. 2009-112601

(51) Int. Cl.
*F02B 31/06* (2006.01)
(52) U.S. Cl. ........ 123/306; 123/308; 123/432; 123/399; 73/114.36
(58) Field of Classification Search .................. 123/306, 123/308, 399, 432; 73/114.36
See application file for complete search history.

(56) References Cited

U.S. PATENT DOCUMENTS

| | | | |
|---|---|---|---|
| 6,135,085 A | 10/2000 | Toyohara et al. | |
| 6,575,133 B2 * | 6/2003 | Ries-Mueller et al. | 123/306 |
| 6,711,492 B1 * | 3/2004 | Pursifull et al. | 701/114 |
| 6,763,800 B1 * | 7/2004 | Sun et al. | 123/306 |
| 7,111,610 B2 * | 9/2006 | Nidigattu | 123/399 |
| 7,114,487 B2 * | 10/2006 | Hedrick et al. | 123/399 |
| 7,721,707 B2 * | 5/2010 | Yagihashi | 123/361 |

FOREIGN PATENT DOCUMENTS

| | | |
|---|---|---|
| JP | 62-223440 | 10/1987 |
| JP | U-64-056543 | 4/1989 |
| JP | 11-190218 | 7/1999 |
| JP | 2008-002428 | 1/2008 |
| JP | 2009-062833 | 3/2009 |

* cited by examiner

*Primary Examiner* — Erick Solis
(74) *Attorney, Agent, or Firm* — Nixon & Vanderhye PC

(57) ABSTRACT

A controlling device for an internal combustion engine includes an estimating portion to calculate an estimation value relative to an open degree of a valve based on a predetermined estimation formula. A signal of a sensor is changed, when the valve has a predetermined open degree defined between a full close and a full open. The estimating portion determines that an actual open degree of the valve is smaller than the predetermined open degree, in a case that the signal of the sensor is not changed when the estimation value becomes equal to or larger than the predetermined open degree.

9 Claims, 3 Drawing Sheets

CONTROLLING DEVICE AND METHOD OF ESTIMATING VALVE OPENING FOR INTERNAL COMBUSTION ENGINE

CROSS REFERENCE TO RELATED APPLICATION

This application is based on Japanese Patent Application No. 2009-112601 filed on May 7, 2009, the disclosure of which is incorporated herein by reference in its entirety.

BACKGROUND OF THE INVENTION

1. Field of the Invention

The present invention relates to a controlling device for an internal combustion engine, and a method of estimating an open degree of an intake air flow controlling valve of the internal combustion engine.

2. Description of Related Art

An internal combustion engine has a combustion chamber and an intake air flow controlling valve. The valve generates vortex flow of air-fuel mixture in the combustion chamber, and is arranged at a downstream side of a throttle valve. The vortex flow may be a tumble flow or swirl flow, for example.

The internal combustion engine further has a controlling device to control ignition timing and fuel amount based on an open degree of the valve. Therefore, it is important to accurately detect the open degree of the valve so as to improve drive performance.

JP-A-62-223440 or JP-A-H11-190218 discloses a method of detecting an open degree of an intake air flow controlling valve. In the method, only full open and full close of the valve are detected by using a limit switch, or an actual open degree of the valve is linearly monitored by using a linear sensor.

However, when the valve has a mid-opening positioned between the full open and the full close, the method of JP-A-62-223440 fails to detect the mid-opening. In this case, drive performance may not be improved. Although the mid-opening may be able to be estimated, if an estimated value has a large error relative to an actual value, drive performance is lowered. Therefore, accuracy for estimating the open degree is required to be increased.

The method of JP-A-H11-190218 enables an engine to be controlled by using a signal output from the linear sensor. However, cost of the linear sensor is higher than that of the limit switch.

SUMMARY OF THE INVENTION

In view of the foregoing and other problems, it is an object of the present invention to provide a controlling device for an internal combustion engine, and a method of estimating an open degree of an intake air flow controlling valve of the internal combustion engine.

According to a first example of the present invention, a controlling device for an internal combustion engine includes an intake flow controlling valve, an estimating portion and a sensor. The intake flow controlling valve generates vortex flow of intake air in a combustion chamber of the internal combustion engine by opening and closing an intake passage arranged at an upstream side of the combustion chamber. The estimating portion calculates an estimation value relative to an open degree of the valve based on a predetermined estimation formula, while the valve has an operation between a full close and a full open. The sensor outputs a signal ON or OFF. The signal of the sensor is changed, when the valve has a predetermined open degree defined between the full close and the full open. The estimating portion determines that an actual open degree of the valve is smaller than the predetermined open degree, in a case that the signal of the sensor is not changed when the estimation value becomes equal to or larger than the predetermined open degree. The estimating portion keeps the estimation value to be fixed, and causes the valve to continue the operation, until the signal of the sensor is changed, while the actual open degree of the valve is determined to be smaller than the predetermined open degree.

Accordingly, the open degree of the valve is accurately detected at a low cost, such that drive performance can be improved.

According to a second example of the present invention, a controlling device for an internal combustion engine includes an intake flow controlling valve, an estimating portion, a sensor and a memorizing portion. The intake flow controlling valve generates vortex flow of intake air in a combustion chamber of the internal combustion engine by opening and closing an intake passage arranged at an upstream side of the combustion chamber. The estimating portion calculates an estimation value relative to an open degree of the valve based on a predetermined estimation formula, while the valve has an operation between a full close and a full open. The sensor outputs a signal ON or OFF. The signal of the sensor is changed when the valve has a predetermined open degree defined between the full close and the full open. The memorizing portion memorizes a period started when a drive signal is input into the valve and ended when the signal of the sensor is changed. The estimating portion corrects the predetermined estimation formula for a next operation of the valve based on the period.

Accordingly, the open degree of the valve is accurately detected at a low cost, such that drive performance can be improved.

According to a third example of the present invention, a method of estimating an open degree of an intake flow controlling valve includes a detecting step, an estimating step, a determining step and a fixing step. The valve generates vortex flow of intake air in a combustion chamber of an internal combustion engine by opening and closing an intake passage arranged at an upstream side of the combustion chamber. In the detecting step, a signal output from a sensor is detected. The signal is changed between ON and OFF when the valve has a predetermined open degree defined between a full close and a full open. In the estimating step, an open degree of the valve is estimated based on a predetermined estimation formula. In the determining step, an actual open degree of the valve is determined to be smaller than the predetermined open degree, in a case that the signal of the sensor is not changed when the estimated open degree becomes equal to or larger than the predetermined open degree. In the fixing step, the estimated open degree is fixed until the signal of the sensor is changed, while the actual open degree of the valve is determined to be smaller than the predetermined open degree.

Accordingly, the open degree of the valve is accurately detected at a low cost, such that drive performance can be improved.

According to a fourth example of the present invention, a method of estimating an open degree of an intake flow controlling valve includes a detecting step, a memorizing step and an estimating step. The valve generates vortex flow of intake air in a combustion chamber of an internal combustion engine by opening and closing an intake passage arranged at an upstream side of the combustion chamber. In the detecting step, a signal output from a sensor is detected. The signal is changed between ON and OFF when the valve has a predetermined open degree defined between a full close and a full open. In the memorizing step, a period defined to start when a drive signal is input into the valve and to end when the signal of the sensor is changed is memorized. In the estimating step, an open degree of the valve is estimated based on the period. The estimating step is performed by using the period as a learning value.

Accordingly, the open degree of the valve is accurately detected at a low cost, such that drive performance can be improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

First Embodiment

Figure 1:
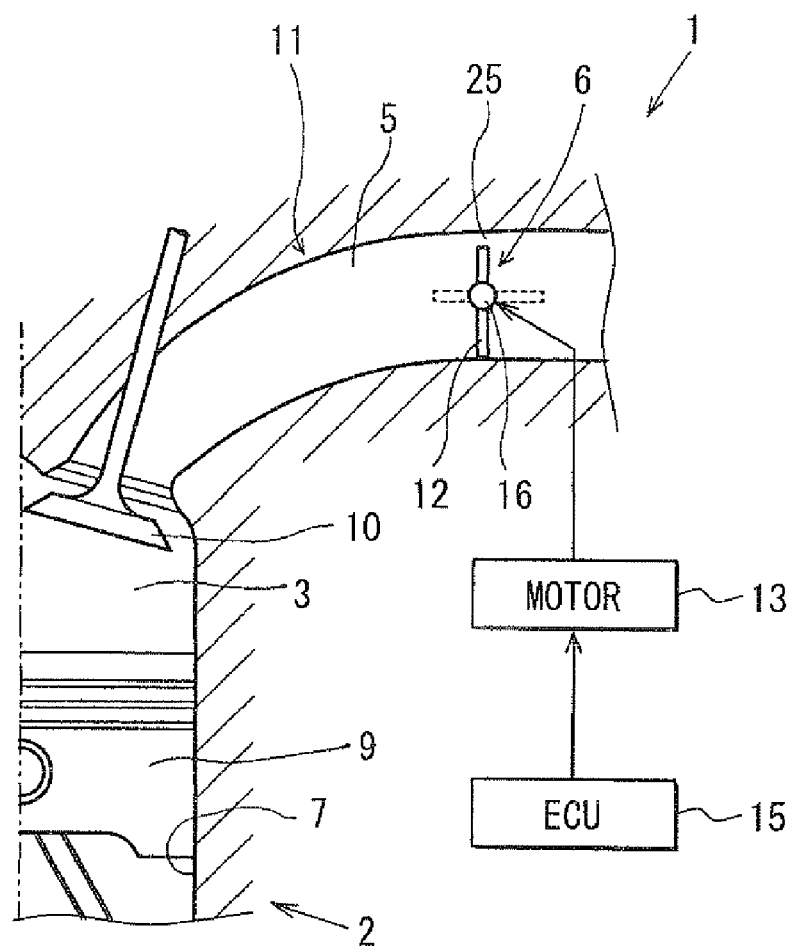
FIG. 1 is a schematic view illustrating a controlling device according to a first embodiment.

As shown in FIG. 1, a controlling device 1 for an internal combustion engine 2 has an intake flow controlling valve 6. The valve 6 generates vortex flow of intake air in a combustion chamber 3 of the internal combustion engine 2. The vortex flow is generated by opening and closing an intake flow passage 5 arranged at an upstream side of the combustion chamber 3. The valve 6 generates longitudinal tumble flow so as to promote combustion, for example.

The internal combustion engine 2 has a cylinder 7 and a piston 9 sliding in the cylinder 7. The combustion chamber 3 is defined by an upper part of the cylinder 7.

The passage 5 is connected to the combustion chamber 3, and introduces intake air into the combustion chamber 3. An intake valve 10 is arranged between the combustion chamber 3 and the passage 5 so as to open or close the passage 5.

The passage 5 is defined by inside of an intake tube 11, and the valve 6 is arranged in the intake tube 11. Further, a throttle valve (not shown) is arranged in the intake tube 11 so as to control an amount of intake air. The valve 6 is arranged at a downstream side of the throttle valve so as to open or close a part of the passage 5.

The valve 6 is made of a butterfly valve, and has a valve member 12 and a motor 13. The motor 13 is an actuator to rotate the valve member 12, and is controlled by an electronic control unit 15 (ECU).

Figure 2:
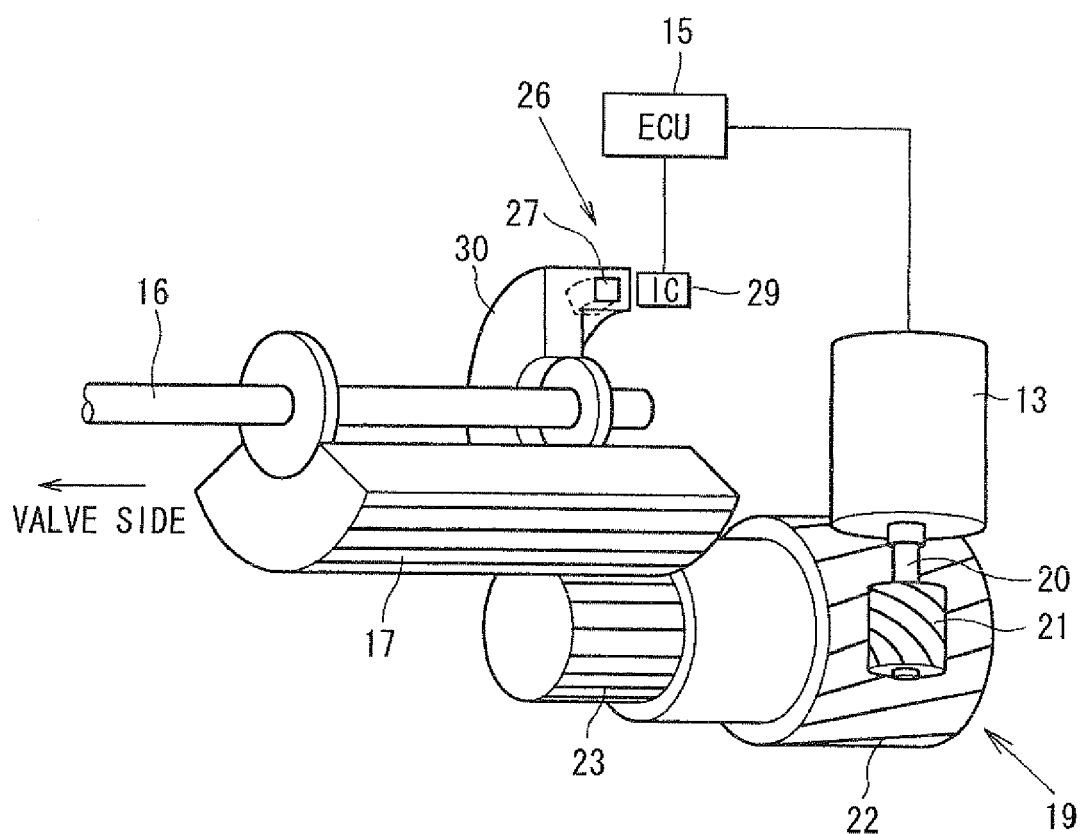
FIG. 2 is a schematic view illustrating a sensor of the controlling device.

The valve member 12 is mounted to an end of a valve shaft 16. As shown in FIG. 2, a valve gear 17 is arranged at the other end of the valve shaft 16. The motor 13 rotates the valve gear 17 through a slowdown gear 19. The valve shaft 16 and the valve member 12 are rotated integrally with the valve gear 17.

The slowdown gear 19 has a warm gear 21, a helical gear 22 and a spur gear 23. The warm gear 21 is fixed to a motor shaft 20 of the motor 13. The helical gear 22 is engaged with the warm gear 21. The spur gear 23 has the same axis as the helical gear 22, and rotates integrally with the helical gear 22. The spur gear 23 is engaged with the valve gear 17.

As shown in an upper part of FIG. 1, the valve member 12 has a cutout 25. When the valve member 12 is totally closed, intake air is introduced only through the cutout 25. Therefore, tumble flow is formed in the combustion chamber 3. As shown in a solid line of FIG. 1, when the valve member 12 is totally closed, most of the passage 5 is blocked by the valve member 12. At this time, the valve member 12 is restricted from having a closing-direction movement, due to a stopper (not shown). The tumble flow is generated in the combustion chamber 3 by intake air disproportionately introduced through an upper part of the intake tube 11.

As shown in a dashed line of FIG. 1, the valve member 12 totally opens the passage 5 without blocking intake air. At this time, the valve member 12 is restricted from having an opening-direction movement, due to a stopper (not shown).

As shown in FIG. 2, the controlling device 1 further has a sensor 26. An output of the sensor 26 is changed between ON and OFF, when the valve 6 has a predetermined open degree. The predetermined open degree is defined between a full close degree and a full open degree.

The sensor 26 has a magnet 27 and a Hall IC 29. The magnet 27 is fixed on an outer side of the valve shaft 16 in a radial direction, and is rotatable integrally with the valve shaft 16. The IC 29 is arranged to oppose to the magnet 27, and is not rotated with the valve shaft 16.

The magnet 27 is a permanent magnet to continue to generate magnetic force stably for a long time. The magnet 27 is held by a magnet rotor 30, and the magnet rotor 30 is fixed to the valve shaft 16. The magnet 27 is rotated relative to the IC 29.

The Hall IC 29 is formed by integrating a Hall element and an amplifying circuit. The Hall element detects a magnetic field of the magnet 27. An output of the Hall element is varied in accordance with magnetic flux density. The amplifying circuit amplifies the output of the Hall element. The IC 29 outputs a voltage signal corresponding to the magnetic flux density. The signal is not a linear signal. Specifically, the IC 29 outputs an ON signal or OFF signal. In this case, cost of the IC 29 is lower than that of an IC to output a linear signal.

When the magnet 27 and the IC 29 have a predetermined position relationship, the sensor 26 detects a predetermined magnetic flux density. At this time, the output of the sensor 26 is changed between ON and OFF. Thus, the output of the sensor 26 is changed when the valve 6 has a predetermined open degree $\theta 1$, $\theta 2$.

The ECU 15 activates the motor 13 based on a control program or logic memorized in a memory, when an ignition switch is turned on. Further, the ECU 15 drives a throttle opening controlling device such as electric motor, ignition device such as ignition coil or spark plug, and a fuel injection device such as electric fuel pump or injector.

The ECU 15 may correspond to a valve opening estimating portion and a period memorizing portion. When a signal is input into the estimating portion from the sensor 26, the estimating portion estimates an open degree of the valve 6 based on the signal. The memorizing portion memorizes a time period started when a drive signal is input into the valve 6 and ended when the output of the sensor 26 is changed. The ECU 15 drives the ignition device and the fuel injection device based on a valve opening estimated by the estimating portion. Thus, fuel injection timing, fuel ignition timing and fuel amount are controlled.

A method of estimating an opening of the valve 6 will be described with reference to FIG. 3.

When an actual operation of the valve 6 is started, the valve 6 does not start to move simultaneously with a drive signal input into the motor 13. That is, a waste time is generated from the input of the drive signal, and the waste time is defined to end when the valve member 12 starts to move. The valve 6 is defined to have an opening 0° at a full close time, and the valve 6 is defined to have an opening $\theta$max at a full open time.

An opening θ of the valve 6 is linearly increased from 0° to θmax in proportion with a time elapsed from an input of an open signal. The opening θ of the valve 6 is linearly decreased from θmax to 0° in proportion with a time elapsed from an input of a close signal.

The valve 6 has the above-described behavior characteristics representing a valve opening transition relative to time. The behavior characteristics of the valve 6 are expressed in a following formula (1). The opening θ of the valve 6 can be estimated based on the formula (1), when the valve 6 has an opening operation from the full close 0° to the full open θmax. In the formula (1), the opening θ is defined by a time gradient "a", a waste time "b", and a time "t" elapsed from an input of a drive signal.

$$\theta = a(t-b) \tag{1}$$

(i) The opening θ of the valve 6 is estimated at an initial opening operation from the full close 0° to the full open θmax.

The initial operation is defined by a first time operation of the valve 6 from the full close 0° to the full open θmax. The opening θ of valve 6 is returned from the full open θmax to the full close 0° in a next operation to be performed after the initial operation. The initial operation may be performed at the first time after a battery is changed. At this time, the controlling device 1 does not have learning information. Alternatively, the initial operation may be performed at the first time after the learning information is reset by a malfunction.

The estimating portion estimates the opening θ of the valve 6 based on the formula (1) using constant values of the time gradient "a" and the waste time "b", when an open signal is input.

Figure 3:
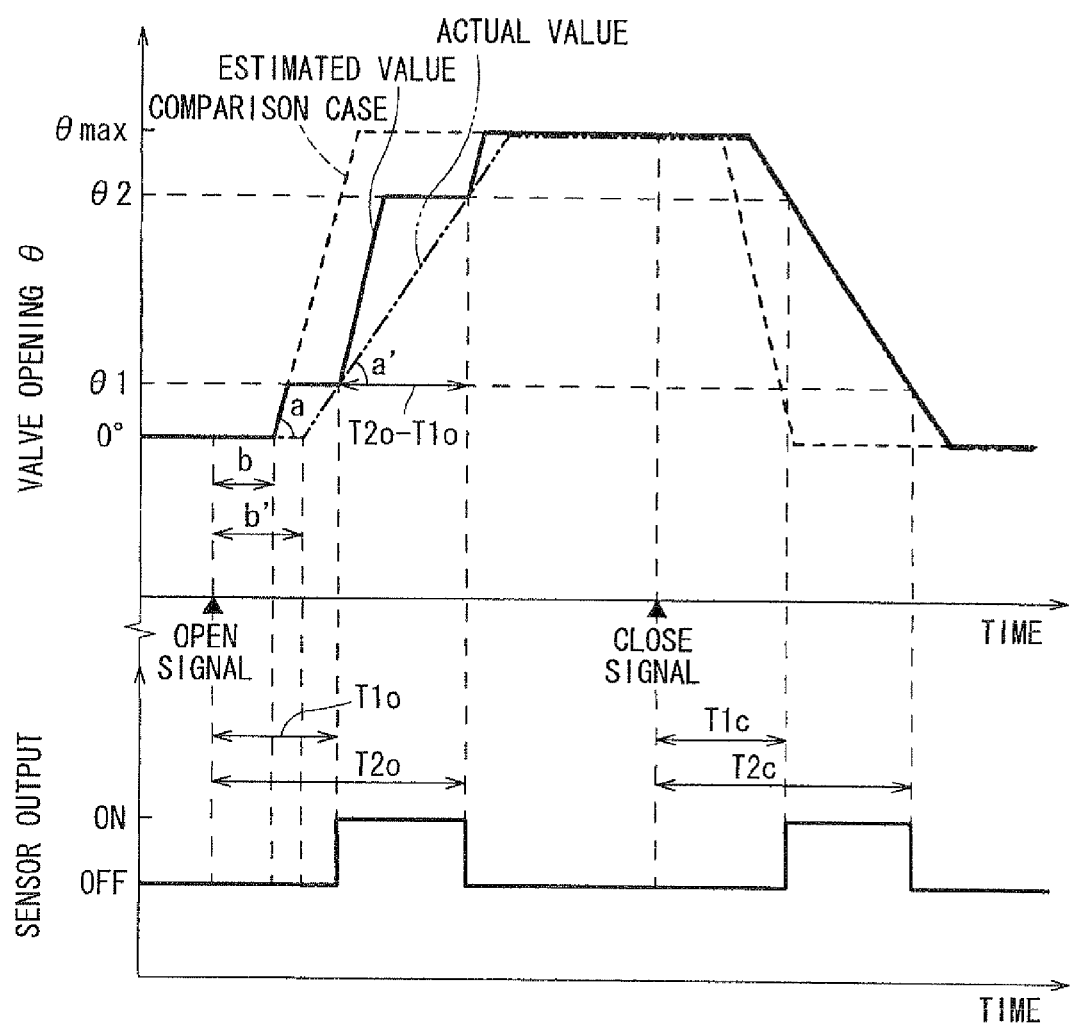
FIG. 3 is a time chart illustrating valve openings and sensor outputs.

However, if an estimated value has an error relative to an actual value, the estimated value shown in a solid line of FIG. 3 is separated from the actual value shown in a double chain line of FIG. 3.

In a case that the output of the sensor 26 is not changed when the estimated value reaches a predetermined value θ1, θ2, the estimating portion determines the actual value does not reach the predetermined value θ1, θ2. At this time, the estimating portion fixes the estimated value, until the output of the sensor 26 is changed. This process may be defined as a process of guarding the estimated value.

The output of the sensor 26 is to be changed when the opening θ of the valve 6 reaches the predetermined value θ1, θ2. However, in an actual situation, the output of the sensor 26 is not changed when the opening θ of the valve 6 reaches the predetermined value θ1, θ2. At this time, the estimating portion determines the actual value does not reach the predetermined value θ1, θ2. The estimated value is fixed to be the predetermined value θ1, θ2, until the output of the sensor 26 is changed. Thus, the estimated value is guarded.

When the output of the sensor 26 is changed, the actual value is determined to reach the predetermined value θ1, θ2. Therefore, the guard of the estimated value is cancelled, and an estimation of valve opening is again performed based on the formula (1).

At this time, the memorizing portion memorizes a period T1o and a period T2o, due to a period memorize process. The period T1o is defined to start when an open signal is input and to end when the output of the sensor 26 is changed at the predetermined value θ1. The period T2o is defined to start when an open signal is input and to end when the output of the sensor 26 is changed at the predetermined value θ2.

(ii) The opening θ of the valve 6 is estimated at a next closing operation from the full open θmax to the full close 0°.

The estimating portion corrects the formula (1) into a formula (2) by using the period T1o, T2o, and calculates an estimation value based on the formula (2). This process may be defined as a learning process.

$$\theta = \theta max - a'(t-b')$$

$$a' = (\theta 2 - \theta 1)/(T2o - T1o)$$

$$b' = T1o - \theta 1/a' \tag{2}$$

Actual valve behavior characteristics such as time gradient or waste time can be defined by using the period T1o, T2o, for the operation from the full close 0° to the full open θmax, as shown in the double chain line of FIG. 3. Therefore, the time gradient "a" and the waste time "b" of the formula (1) are corrected into a time gradient a' and a waste time b' based on the period T1o, 12o. Thus, the formula (2) corresponds to the actual valve behavior characteristics, and estimation can be performed so as to correspond to the actual valve behavior characteristics.

When a next open signal is input, the period T1o, T2o is memorized as learning value. Therefore, the formula (1) is corrected into a formula (3) based on the period T1o, T2o. When a new operation of the valve 6 is performed from the full close 0° to the full open θmax, the opening θ of the valve 6 is estimated based on the formula (3), due to the learning process.

$$\theta = a'(t-b') \tag{3}$$

The memorizing portion updates the period T1o, T2o, and memorizes the updated period T1o, T2o. The updated period T1c, T2o is used for estimating the opening θ of the valve 6 in a new operation from the full open θmax to the full close 0°. The above-described processes are repeated.

According to the first embodiment, the controlling device 1 has the sensor 26, and the output of the sensor 26 is changed when the valve 6 has the predetermined opening θ1, θ2. The estimating portion determines that an actual open degree of the valve 6 is smaller than the predetermined opening θ1, θ2, in a case that the signal of the sensor 26 is not changed when an estimation value becomes equal to or larger than the predetermined opening θ1, θ2. The estimating portion keeps the estimation value to be fixed, and causes the valve 6 to continue the operation, until the signal of the sensor 26 is changed, while the actual open degree of the valve 6 is determined to be smaller than the predetermined opening θ1, θ2.

Therefore, an error between the estimation value and the actual value can be detected by the output of the sensor 26. The error can be made smaller by fixing the estimation value.

Thus, the opening θ of the valve 6 can be accurately detected at a low cost, without using an expensive system such as a linear sensor. Accordingly, drive performance can be improved.

The controlling device 1 memorizes the period T1o, T2o. The period T1o, T2o is defined to start when a drive signal is input into the valve 6 and to end when the output of the sensor 26 is changed. The controlling device 1 estimates the opening θ of the valve 6 for a next operation based on an estimation formula corrected by using the period T1o, T2o.

The period T1o, T2o is measured and learned by using the output of the sensor 26, thereby the behavior characteristics of the valve 6 can be defined in the estimation formula. For a next operation of the valve 6, the learning value can be used in the estimation formula, and estimation can be performed based on the estimation formula. Thus, the estimation can be accurately performed by using a low cost sensor.

A dashed line of FIG. 3 represents a comparison case, in which estimation is performed by using fixed constants "a" and "b". In this case, the constants "a" and "b" do not correspond to the actual valve behavior characteristics. Therefore, a large error is generated between the actual value and the estimation value. In contrast, according to the first embodiment, the actual valve behavior characteristics of the valve 6 can be obtained by the sensor 26, and the constants "a" and "b" are corrected. Thus, the error between the actual value and the estimation value can be reduced.

The learning process may not be performed, or the learning value may be reset, by a sudden malfunction, for example. Further, the learning process is not yet performed immediately after a battery is changed. However, in these cases, due to the estimation value guard process, the error can be reduced.

The controlling device 1 memorizes the period T1$o$, T2$o$ in an opening operation from the full close 0° to the full open θmax, and corrects the estimation formula by using the memorized period T1$o$, T2$o$. When the valve 6 has a closing operation from the full open θmax to the full close 0°, the opening θ of the valve 6 is estimated based on the corrected estimation formula.

The valve behavior characteristics are similar between the opening operation and the closing operation. Therefore, a value learned in the opening operation is used in the closing operation. Thus, the opening θ of the valve 6 can be accurately estimated when the valve 6 has the closing operation.

Second Embodiment

A second embodiment will be described in points different from the first embodiment.

(i) The opening θ of the valve 6 is estimated when an initial opening operation is performed from a full close 0° to a full open θmax.

When an open signal is input, an estimating portion estimates the opening θ of the valve 6 based on a formula (1) using constants "a" and "b". During the estimation, the estimation value guard process of the first embodiment is performed.

At this time, a memorizing portion memorizes a period T1$o$, T2$o$, when the valve 6 has an opening operation from the full close 0° to the full open θmax. The period T1$o$, T2$o$ is defined to start when the open signal is input into the valve 6 and to end when an output of a sensor 26 is changed.

(ii) The opening θ of the valve 6 is estimated when an initial closing operation is performed from a full open θmax to a full close 0°.

When a close signal is input, the estimating portion estimates the opening θ of the valve 6 based on a formula (4) using the constants "a" and "b". During the estimation, the estimation value guard process of the first embodiment is performed.

$$\theta = \theta\max - a(t-b) \quad (4)$$

At this time, the memorizing portion memorizes a period T1$c$, T2$c$, when the valve 6 has a closing operation from the full open θmax to the full close 0°. The period T1$c$, T2$c$ is defined to start when the close signal is input into the valve 6 and to end when the output of the sensor 26 is changed.

(iii) The opening θ of the valve 6 is estimated when a next opening operation is performed from the full close 0° to the full open θmax.

The estimating portion corrects the formula (1) into a formula (5) based on the period T1$o$, T2$o$. When a new opening operation of the valve 6 is performed from full close 0° to the full open θmax, the opening θ of the valve 6 is estimated based on the formula (5), due to the learning process.

$$\theta = a'(t-b')$$
$$a' = (\theta 2 - \theta 1)/(T2o - T1o)$$
$$b' = T1o - \theta 01/a' \quad (5)$$

That is, the time gradient "a" and the waste time "b" of the formula (1) are corrected into a time gradient a' and a waste time b' based on the period T1$o$, T2$o$. Thus, the formula (5) corresponds to the actual valve behavior characteristics, and estimation can be performed so as to correspond to the actual valve behavior characteristics.

(iv) The opening θ of the valve 6 is estimated when a next closing operation is performed from the full open θmax to the full close 0°.

The estimating portion corrects the formula (4) into a formula (6) based on the period T1$c$, T2$c$. When a new closing operation of the valve 6 is performed from the full open θmax to the full close 0°, the opening θ of the valve 6 is estimated based on the formula (6), due to the learning process.

$$\theta = \theta\max - a''(t-b'')$$
$$a'' = (\theta 2 - \theta 1)/(T2c - T1c)$$
$$b'' = T1c - \theta 1 a'' \quad (6)$$

That is, the time gradient "a" and the waste time "b" of the formula (4) are corrected into a time gradient a'' and a waste time b'' based on the period T1$c$, T2$c$. Thus, the formula (6) corresponds to the actual valve behavior characteristics, and estimation can be performed so as to correspond to the actual valve behavior characteristics.

According to the second embodiment, the controlling device 1 learns the period T1$o$, T2$o$ as a learning value in the initial opening operation from the full close 0° to the full open θmax, and uses the learning value in the next opening operation from the full close 0° to the full open θmax. The controlling device 1 learns the period T1$c$, T2$c$ as a learning value in the initial closing operation from the full open θmax to the full close 0°, and uses the learning value in the next closing operation from the full open θmax to the full close 0°.

Therefore, if the valve behavior characteristics are different between the opening operation and the closing operation, the value learned in the opening operation is used in the next opening operation, and the value learned in the closing operation is used in the next closing operation. Thus, the opening θ of the valve 6 can be accurately estimated.

(Modification)

In the first and second embodiments, the opening θ of the valve 6 is linearly changed in proportion with the time "t" elapsed from a timing at which the drive signal is input into the motor 13. The linear change is approximated into a linear equation corresponding to the formula (1). Alternatively, when the valve behavior characteristics are able to be approximated into a quadratic equation, the estimation formula may be made of the quadratic equation. In this case, a period taken for changing the output of the sensor 26 is memorized. The estimation formula is corrected for a next operation by using the period, and the opening θ of the valve 6 is estimated based on the corrected formula.

In the first and second embodiments, the output of the sensor 26 is changed at the two predetermined openings θ1, θ2. Alternatively, if the waste time is small enough to be ignored, the output of the sensor 26 may be changed at only one predetermined opening.

In this case, the constant "b" of the formula (1) can be assumed to be zero. Therefore, in a case that the one predetermined opening is set, when a timing that the valve 6 has the one predetermined opening is obtained, the constant a' or a" can be obtained.

For example, in the first embodiment, if the waste time is small enough, the opening θ of the valve 6 is estimated based on a formula θ=at, in the initial opening operation from the full close 0° to the full open θmax. In the next closing operation from the full open θmax to the full close 0°, the constant "a" is corrected into a'=θ1/T1o, and estimation is performed based on a formula θ=θmax−a't.

Such changes and modifications are to be understood as being within the scope of the present invention as defined by the appended claims.

What is claimed is:

1. A controlling device for an internal combustion engine comprising:
   an intake flow controlling valve to generate vortex flow of intake air in a combustion chamber of the internal combustion engine by opening and closing an intake passage arranged at an upstream side of the combustion chamber;
   an estimating portion to calculate an estimation value relative to an open degree of the valve based on a predetermined estimation formula, while the valve has an operation between a full close and a full open; and
   a ON-OFF sensor to output a signal, wherein
   the signal of the sensor is changed, when the valve has a predetermined open degree defined between the full close and the full open,
   the estimating portion determines that an actual open degree of the valve is smaller than the predetermined open degree, in a case where the signal of the ON-OFF sensor is not changed when the estimation value becomes equal to or larger than the predetermined open degree, and
   the estimating portion keeps the estimation value to be fixed, until the signal of the ON-OFF sensor is changed, while the actual open degree of the valve is determined to be smaller than the predetermined open degree.

2. The controlling device according to claim 1, further comprising:
   a memorizing portion to memorize a period T started when a drive signal is input into the valve and ended when the signal of the ON-OFF sensor is changed, wherein
   the estimating portion corrects the predetermined estimation formula for a next operation of the valve based on the period T memorized in the memorizing portion.

3. The controlling device according to claim 2, wherein
   the memorizing portion memorizes a period To started when an open signal is input into the valve and ended when the signal of the ON-OFF sensor is changed, while the valve has an opening operation from a full close to a full open, and
   the estimating portion corrects the predetermined estimation formula using the memorized period To and calculates the estimation value based on the corrected estimation formula, while the valve has a next closing operation from a full open to a full close.

4. The controlling device according to claim 2, wherein
   the memorizing portion memorizes a period To and a period Tc,
   the period To is started when an open signal is input into the valve and ended when the signal of the ON-OFF sensor is changed, while the valve has an opening operation from a full close to a full open, and
   the period Tc is started when a close signal is input into the valve and ended when the signal of the ON-OFF sensor is changed, while the valve has a closing operation from a full open to a full close,
   the estimating portion corrects the predetermined estimation formula based on the period To, and calculates the estimation value based on the corrected estimation formula, while the valve has a next opening operation from a full close to a full open, and the estimating portion corrects the predetermined estimation formula based on the period Tc, and calculates the estimation value based on the corrected estimation formula, while the valve has a next closing operation from a full open to a full close.

5. A controlling device for an internal combustion engine comprising:
   an intake flow controlling valve to generate vortex flow of intake air in a combustion chamber of the internal combustion engine by opening and closing an intake passage arranged at an upstream side of the combustion chamber;
   an estimating portion to calculate an estimation value relative to an open degree of the valve based on a predetermined estimation formula, while the valve has an operation between a full close and a full open;
   a ON-OFF sensor to output a signal, the signal of the sensor being changed when the valve has a predetermined open degree defined between the full close and the full open; and
   a memorizing portion to memorize a period T started when a drive signal is input into the valve and ended when the signal of the ON-OFF sensor is changed, wherein
   the estimating portion corrects the predetermined estimation formula for a next operation of the valve based on the period T memorized in the memorizing portion.

6. The controlling device according to claim 5, wherein
   the memorizing portion memorizes a period To started when an open signal is input into the valve and ended when the signal of the ON-OFF sensor is changed, while the valve has an opening operation from a full close to a full open, and
   the estimating portion corrects the predetermined estimation formula using the memorized period To and calculates the estimation value based on the corrected estimation formula, while the valve has a next closing operation from a full open to a full close.

7. The controlling device according to claim 5, wherein
   the memorizing portion memorizes a period To and a period Tc,
   the period To is started when an open signal is input into the valve and ended when the signal of the ON-OFF sensor is changed, while the valve has an opening operation from a full close to a full open, and
   the period Tc is started when a close signal is input into the valve and ended when the signal of the ON-OFF sensor is changed, while the valve has a closing operation from a full open to a full close,
   the estimating portion corrects the predetermined estimation formula based on the period To, and calculates the estimation value based on the corrected estimation formula, while the valve has a next opening operation from a full close to a full open, and
   the estimating portion corrects the predetermined estimation formula based on the period Tc, and calculates the estimation value based on the corrected estimation formula, while the valve has a next closing operation from a full open to a full close.

8. A method of estimating an open degree of an intake flow controlling valve, the valve generating vortex flow of intake air in a combustion chamber of an internal combustion engine by opening and closing an intake passage arranged at an upstream side of the combustion chamber, the method comprising:

detecting a signal output from a ON-OFF sensor, the signal being changed when the valve has a predetermined open degree defined between a full close and a full open;

estimating an open degree of the valve based on a predetermined estimation formula;

determining an actual open degree of the valve to be smaller than the predetermined open degree, in a case where the signal of the ON-OFF sensor is not changed when the estimated open degree becomes equal to or larger than the predetermined open degree; and fixing the estimated open degree until the signal of the ON-OFF sensor is changed, while the actual open degree of the valve is determined to be smaller than the predetermined open degree.

9. A method of estimating an open degree of an intake flow controlling valve, the valve generating vortex flow of intake air in a combustion chamber of an internal combustion engine by opening and closing an intake passage arranged at an upstream side of the combustion chamber, the method comprising:

detecting a signal output from a ON-OFF sensor, the signal being changed when the valve has a predetermined open degree defined between a full close and a full open;

memorizing a period T started when a drive signal is input into the valve and ended when the signal of the sensor is changed; and estimating an open degree of the valve, wherein
        the estimating is performed by using the period T as a learning value.

\* \* \* \* \*